United States Patent
Voigt et al.

(10) Patent No.: US 12,458,114 B2
(45) Date of Patent: Nov. 4, 2025

(54) FLEXIBLE TOUCH FASTENER PRODUCTS

(71) Applicant: Velcro IP Holdings LLC, Manchester, NH (US)

(72) Inventors: Paul Joseph Voigt, Waterdown (CA); Victor Horst Kheil, Kitchener (CA); Roger R. Beech, Brighton, MI (US)

(73) Assignee: Velcro IP Holdings LLC, Manchester, NH (US)

( * ) Notice: Subject to any disclaimer, the term of this patent is extended or adjusted under 35 U.S.C. 154(b) by 73 days.

(21) Appl. No.: 18/207,858

(22) Filed: Jun. 9, 2023

(65) Prior Publication Data

US 2023/0404220 A1 Dec. 21, 2023

Related U.S. Application Data

(60) Provisional application No. 63/352,653, filed on Jun. 16, 2022.

(51) Int. Cl.
 *A44B 18/00* (2006.01)
(52) U.S. Cl.
 CPC .............................. *A44B 18/0073* (2013.01)
(58) Field of Classification Search
 CPC ............ A44B 18/0069; A44B 18/0073; A44B 18/0076; B29C 43/28; B29C 43/24; B29C 48/15; B29C 48/18; A44D 2203/00; F16B 5/07; F16B 2200/83; F16B 2200/81
 See application file for complete search history.

(56) References Cited

U.S. PATENT DOCUMENTS

| | | |
|---|---|---|
| 4,563,380 A | 1/1986 | Black et al. |
| 4,802,939 A | 2/1989 | Billarant et al. |
| 4,814,036 A | 3/1989 | Hatch |
| 4,842,916 A | 6/1989 | Ogawa et al. |
| 4,931,344 A | 6/1990 | Ogawa et al. |

(Continued)

FOREIGN PATENT DOCUMENTS

| | | |
|---|---|---|
| CN | 1204235 A | 1/1999 |
| CN | 1305759 A | 8/2001 |

(Continued)

OTHER PUBLICATIONS

International Preliminary Report on Patentability in International Appln. No. PCT/US2023/024921, mailed on Sep. 13, 2024, 7 pages.

(Continued)

*Primary Examiner* — Monica A Huson
(74) *Attorney, Agent, or Firm* — Fish & Richardson P.C.

(57) ABSTRACT

A sheet-form fastener product has a flexible substrate such as a lightweight non-woven fabric and a resin layer covering only part of one side of the flexible substrate and leaving a region of the flexible substrate exposed. The resin layer carries multiple touch fastener elements each having a resin stem extending integrally from the layer away from the flexible substrate to an engageable head. A flexible ferromagnetic coating is bonded to the flexible substrate and extends under both the resin layer and the exposed region of the flexible substrate. The resin layer can be arranged as spaced-apart lanes or islands of resin and the coating can be arranged as spaced lanes or islands or otherwise leaving at least a portion of the substrate exposed.

30 Claims, 7 Drawing Sheets

(56) References Cited

U.S. PATENT DOCUMENTS

| | | | |
|---|---|---|---|
| 4,933,035 A | 6/1990 | Billarant et al. |
| 4,933,224 A | 6/1990 | Hatch |
| 5,180,618 A | 1/1993 | Kessler et al. |
| 5,500,268 A | 3/1996 | Billarant |
| 5,554,333 A * | 9/1996 | Fujiki | B29C 59/046 |
| | | | 425/327 |
| 5,606,781 A | 3/1997 | Provost et al. |
| 5,766,723 A | 6/1998 | Oborny et al. |
| 5,945,193 A | 8/1999 | Pollard et al. |
| 6,537,643 B1 * | 3/2003 | Poulakis | A44B 18/0076 |
| | | | 24/442 |
| 6,540,863 B2 | 4/2003 | Kenney et al. |
| 2001/0001283 A1 | 5/2001 | Kennedy et al. |
| 2001/0038161 A1 | 11/2001 | Kenney et al. |
| 2002/0022108 A1 | 2/2002 | Krantz et al. |
| 2003/0034583 A1 | 2/2003 | Provost |
| 2003/0074768 A1 | 4/2003 | Shepard et al. |
| 2005/0060849 A1 | 3/2005 | VanBen schoten et al. |
| 2005/0101930 A1 | 5/2005 | Tachauer et al. |
| 2006/0226571 A1 | 10/2006 | Clune |
| 2009/0277566 A1 | 11/2009 | Lawrence et al. |
| 2013/0067701 A1 | 3/2013 | Grady et al. |
| 2015/0104614 A1 | 4/2015 | Gallant et al. |
| 2016/0309855 A1 | 10/2016 | Medina et al. |
| 2021/0339664 A1 | 11/2021 | Voigt et al. |
| 2023/0104258 A1 | 4/2023 | Voigt et al. |

FOREIGN PATENT DOCUMENTS

| | | |
|---|---|---|
| CN | 1438844 A | 8/2003 |
| CN | 1799807 A | 7/2006 |
| CN | 1949995 A | 4/2007 |
| CN | 110494608 A | 11/2019 |
| CN | 112716114 A | 4/2021 |
| DE | 1944313 A1 | 3/1971 |
| EP | 1661477 A1 | 5/2006 |
| FR | 2750319 A1 | 1/1998 |
| JP | H05-211909 A | 8/1993 |
| JP | H06-33359 A | 2/1994 |
| WO | WO 2012/066418 | 5/2012 |

OTHER PUBLICATIONS

International Search Report and Written Opinion in International Appln. No. PCT/US2023/024921, mailed on Sep. 1, 2023, 12 pages.

\* cited by examiner

FLEXIBLE TOUCH FASTENER PRODUCTS

CROSS REFERENCE TO RELATED APPLICATION

This application claims priority to U.S. Provisional Application No. 63/352,653, filed Jun. 16, 2022, the contents of which are incorporated herein by reference in its entirety.

TECHNICAL FIELD

This invention relates to flexible touch fastener products and methods of making and using such products.

BACKGROUND

Vehicle seats are commonly formed by molding a foam cushion to have a desired seat surface contour, and then covering the molded foam cushion with an upholstery or seat cover. The seat cover may be secured to the foam cushion with various fasteners, such as touch fasteners. For touch fastening, a male (hook) touch fastener may be attached to the foam cushion and adapted to engage with fibers or loops on an underside of the seat cover. The male touch fastener may be a fastening strip placed in the mold in which the seat cushion is molded. Such fastening strips are commonly called 'mold-in fasteners' and become part of the surface of the molded seat cushion. One of the challenges with mold-in fasteners is that their male touch fastener elements must remain sufficiently unfouled during the foam molding process so that they are exposed to engage the seat cover. This can be particularly important with narrow fastener strips, such as those placed on a narrow pedestal in the mold that forms a corresponding trench in the seat cushion.

Seat designers continue to optimize the shape and configuration of seat cushions for comfort and function, and this leads to an ongoing need for improving the way covers are held to cushions, particularly for high-use applications in which an occupant must enter and exit the vehicle repeatedly. Some seat designers would rather not have deep creases and tuck points as were common with hog ring and narrow fastening strips. Beyond the field of seat cushions, improvements in flexible, wide sheet-form touch fastener products are sought.

SUMMARY

One aspect of the invention features a method of making a longitudinally continuous touch fastener product. The method includes unspooling a flexible substrate having a ferromagnetic coating, feeding the flexible substrate into a molding nip, and molding a resin layer on a first side of the flexible substrate, leaving a region of the first side of the flexible substrate exposed, such that the ferromagnetic coating extends under both the resin layer and the exposed region of the first side of the flexible substrate.

In some embodiments, the ferromagnetic coating covers only a portion of a second side of the flexible substrate, as the flexible substrate is fed into the molding nip.

For example, in some cases the ferromagnetic coating is arranged in spaced apart coating lanes. The coating lanes may be electrically conductive along a length of the fastener product, so as to conduct electrical signals or power, or provide resistance heating, in a finished product.

As another example, the ferromagnetic coating may be arranged in spaced apart coating islands, each coating island surrounded by exposed substrate.

In another example, the second side of the flexible substrate has longitudinal selvedges free of ferromagnetic coating.

In some cases the ferromagnetic coating defines passages in which the flexible substrate is exposed. The passages may advantageously underlie the resin layer, such that the resin layer impedes flow through the passages.

In some examples the resin layer is molded such that the touch fastener elements are the only features, or the only molded features, extending from the layer away from the flexible substrate.

In some embodiments, the resin layer is molded in multiple parallel lanes of resin and the exposed region includes multiple areas of exposed substrate between the lanes of resin. In some cases, the flexible ferromagnetic coating extends under all of the parallel lanes of resin.

In some embodiments, the resin layer is molded in multiple islands of resin each surrounded by the exposed region.

In some cases, feeding the flexible substrate into the molding nip involves feeding a non-woven textile material into the molding nip.

In some examples, the flexible ferromagnetic coating is impermeable to air, such as at low pressures or pressures encountered in use.

The flexible ferromagnetic coating may include particles containing iron, such as stainless steel particles, suspended in a polymeric material.

The method may also include, after molding the resin layer, spooling the touch fastener product to form a roll.

The flexible substrate, as fed into the nip, may have, for example, a width of between 5 and 60 centimeters.

Another aspect of the invention features a fastener product with a flexible substrate, a resin layer covering only part of a first side of the flexible substrate and leaving a region of the first side of the flexible substrate exposed, and a flexible ferromagnetic coating bonded to the flexible substrate. The resin layer carries multiple touch fastener elements each having a resin stem extending integrally from the layer away from the flexible substrate to an engageable head. The flexible ferromagnetic coating is bonded to the flexible substrate on a second side of the flexible substrate and extends under both the resin layer and the exposed region of the first side of the flexible substrate, leaving at least a portion of the second side of the flexible substrate exposed and free of ferromagnetic coating.

In some embodiments, the ferromagnetic coating is arranged in spaced apart coating lanes. The coating lanes may be electrically conductive along a length of the fastener product, so as to conduct electrical signals or power, or provide resistance heating, in a finished product.

In some embodiments, the ferromagnetic coating is arranged in spaced apart coating islands, each coating island surrounded by exposed substrate.

In some cases, the second side of the flexible substrate has longitudinal selvedges free of ferromagnetic coating.

The ferromagnetic coating may define passages in which the flexible substrate is exposed. Such passages may advantageously underlie the resin layer, such that the resin layer impedes flow, such as flow of a foaming resin, through the passages.

In some examples, the touch fastener elements are the only features, or the only features of molded resin, extending from the layer away from the flexible substrate.

In some embodiments, the layer includes multiple parallel lanes of resin and the exposed region includes multiple areas of exposed substrate between the lanes of resin. In some cases, the flexible ferromagnetic coating extends under all of the parallel lanes of resin. The ferromagnetic coating may be arranged in spaced apart coating lanes. The coating lanes and the lanes of resin may advantageously not appreciably overlap in thickness, such as to improve stability and density when spooled on a roll.

In some embodiments the resin layer includes multiple islands of resin each surrounded by the exposed region.

In some examples the flexible substrate includes, or consists of, a non-woven textile material.

In some cases the flexible ferromagnetic coating is impermeable to air.

The flexible ferromagnetic coating may include particles containing iron, such as stainless steel particles, suspended in a polymeric material.

In some examples, the fastener product is spooled on a roll. In some cases, the flexible substrate has selvedges on a side opposite the touch fastener elements, in which the flexible substrate is exposed. The flexible ferromagnetic coating may cover the entire side opposite the touch fasteners other than the selvedges.

In some examples, the fastener product has a width of between 5 and 60 cm.

According to another aspect of the invention, a fastener product includes a flexible substrate, a resin layer covering only part of a first side of the flexible substrate and leaving a region of the first side of the flexible substrate exposed, and a flexible ferromagnetic coating bonded to the flexible substrate on a second side of the flexible substrate and extending under both the resin layer and the exposed region of the first side of the flexible substrate. The resin layer carries multiple touch fastener elements each having a resin stem extending integrally from the resin layer away from the flexible substrate to an engageable head. The resin layer itself includes or is in the form of a plurality of islands of resin, each surrounded by the exposed region of the flexible substrate.

In some embodiments, the ferromagnetic coating covers only a portion of the second side of the flexible substrate.

For example, in some configurations the ferromagnetic coating is arranged in spaced apart coating lanes. The coating lanes may be electrically conductive along a length of the fastener product.

In some cases, the ferromagnetic coating is arranged in spaced apart coating islands, each coating island surrounded by exposed substrate.

In some cases, the second side of the flexible substrate has longitudinal selvedges free of ferromagnetic coating.

In some embodiments, the ferromagnetic coating defines passages in which the flexible substrate is exposed. These passages may underlie the resin islands, such that the resin layer impedes flow through the passages, such as flow of a foaming resin.

In some examples the touch fastener elements are the only features extending from, or the only features integrally molded with and extending from, the resin islands away from the flexible substrate.

In some cases the flexible substrate is or includes or consists of a non-woven textile material.

In some cases the flexible ferromagnetic coating is impermeable to air.

The flexible ferromagnetic coating may include particles containing iron, such as stainless steel particles, suspended in a polymeric material.

In some examples, the fastener product is spooled on a roll. In some cases, the flexible substrate has selvedges on a side opposite the touch fastener elements, in which the flexible substrate is exposed. The flexible ferromagnetic coating may cover the entire side opposite the touch fasteners other than the selvedges.

In some examples, the fastener product has a width of between 5 and 60 cm.

Various embodiments of the invention can be employed to provide fastening functions for seat covers over discrete but relatively wide areas of a seat cushion, in ways that help to prevent wrinkling of the seat cover across the fastening area in use and that provides consistent engagement with a seat cover across, for example, a wide concave seat surface. Various embodiments enable the use of particularly inexpensive materials and can be readily configured for a variety of applications.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
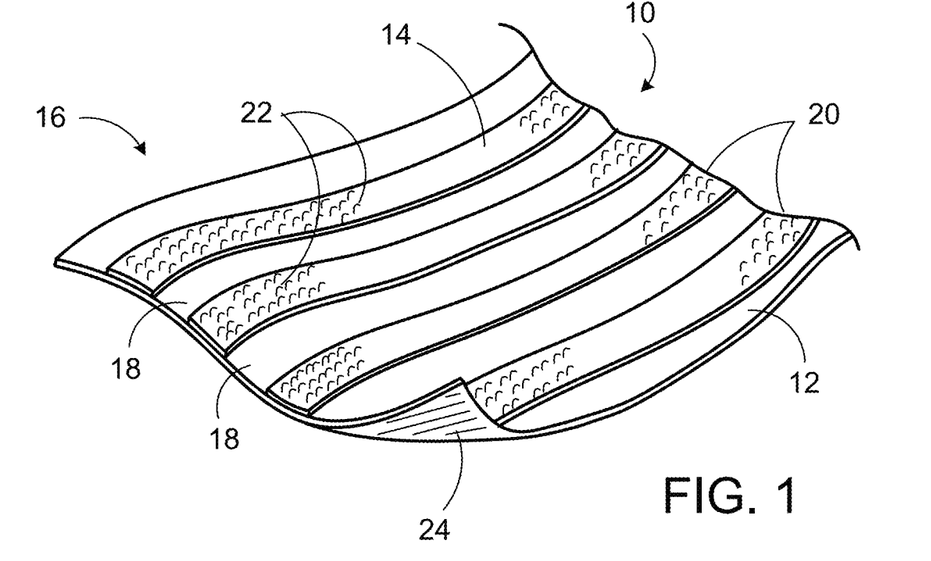
FIG. 1 is a perspective view of a first flexible fastener product.

Referring first to FIG. 1, a fastener product 10 in the form of a thin sheet, has a flexible substrate 12 with a resin layer 14 covering only part of one side 16 of the flexible substrate, leaving one or more regions 18 of the one side of the flexible substrate exposed. In product 10 the resin layer 14 is in the form of multiple parallel lanes 20 of resin separated by exposed substrate regions 18 between the lanes. Each lane 20 of the resin layer 14 carries multiple touch fastener elements 22 that are exposed and configured to snag fibers to form a releasable touch fastening. The regions 18 of exposed substrate between the lanes are void of any touch fastener elements. As will be discussed further below, a flexible ferromagnetic coating 24 is bonded to the flexible substrate (in this example, on a surface of the substrate opposite the side with the resin layer and touch fastener elements) and extends under both the resin layer 14 and the exposed regions 18 of the flexible substrate. In this example, coating 24 essentially covers the entire opposite surface of the substrate. In many examples, as discussed below, the coating 24 leaves at least areas of the opposite surface of the substrate exposed. As a sheet-form product, fastener product 10 can be said to define a plane when flat and is flexible to be readily bent out of its plane in any direction, such as to follow a surface of compound curvature. While the exposed, upper surface of each lane 20 in this example is flat but for the touch fastener elements, in another configuration (not shown) each lane has stiffening ribs running along each longitudinal edge and extending from the resin layer 14 to a height no greater than the height of the touch fastener elements, to increase the bending stiffness of the product about a cross-machine axis.

Figure 2:
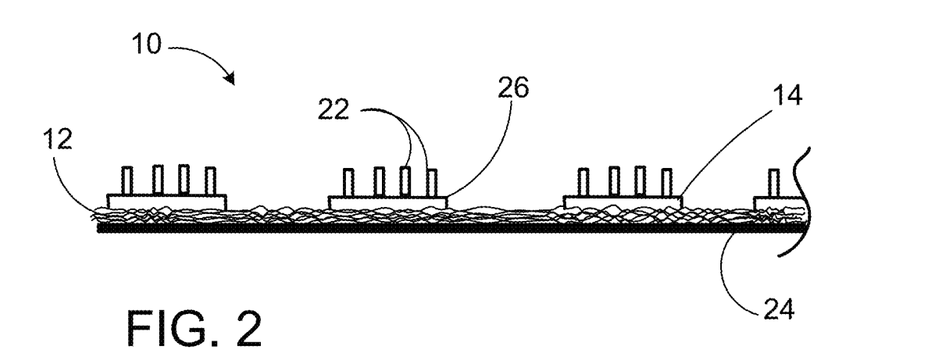
FIG. 2 is an end view of the fastener product of FIG. 1.
Figure 3:
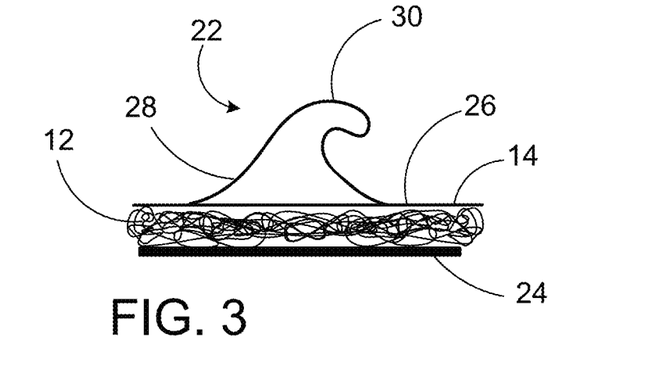
FIG. 3 is an enlarged side view of one of the touch fastener elements of the product of FIG. 1.

Referring also to FIGS. 2 and 3, the flexible substrate 12 is or includes a non-woven fabric to which both the resin layer 14 and the ferromagnetic coating 24 are both permanently affixed. The resin layer 14 is preferably molded directly onto the substrate such that resin of the resin layer 14 encapsulates individual fibers of the surface of the substrate during molding and then solidifies to retain the layer intimately joined to the substrate surface. The bond between the fabric and the resin should be sufficiently strong to withstand separation forces induced by disengaging snagged fibers from the touch fastener elements. In FIG. 2 the touch fastener elements 22 are illustrated with flat, vertical sides due to having been molded contiguously with resin forming the bases 26 of the lanes of the resin layer, in cavities defined between concentrically stacked plates of a mold roll in a continuous molding process as described below with respect to FIG. 12. FIG. 3 shows a side view of an individual touch fastener element 22, illustrating the general profile of the cavity in which the touch fastener element was molded. Each touch fastener element 22 has a resin stem 28 extending integrally from the layer 14 away from the flexible substrate 12 to an engageable head 30. In this example, touch fastener element 22 is illustrated as a J-hook with a single head 30 pointing along the length of the resin layer lane on which it is carried, which corresponds to the machine direction of the continuous manufacturing process in which it was formed. In other examples the touch fastener elements are of other types known in the art, such as palm tree or mushroom types. As shown in this example, the flexible ferromagnetic coating 24 bonded to the flexible substrate 12 extends under all of the lanes 20 of the resin layer 14 and all of the exposed regions 18 on the opposite side of the flexible substrate 12, and the touch fastener elements 22 are the only features extending from the layer 14 away from the flexible substrate 12, the layer being of a generally constant thickness of resin with a flat upper surface.

For mold-in applications, the flexible ferromagnetic coating 24 is preferably such as to provide a barrier to, or to impede, flowing foam during formation of an associated seat cushion. For some applications, the flexible ferromagnetic coating 24 is fully impermeable to air. In some cases, the coating is sufficiently permeable to allow trapped air to escape under molding pressures. While the coating is itself flexible, it does add some stiffness to the substrate. This can allow the use of even lighter, more flexible (and perhaps less expensive) substrate materials.

FIGS. 4-7 illustrate different configurations of the flexible ferromagnetic coating 24. In each configuration, the coating is on a non-woven fabric substrate 12 with lanes of resin carrying touch fastener elements 22, as in the example of FIG. 1.

Figure 4:
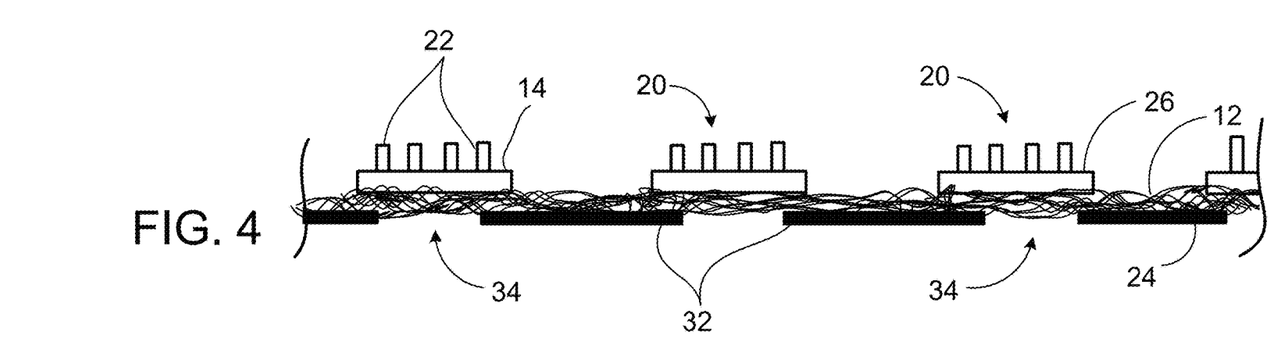
FIGS. 4-7 are end views of other flexible fastener products, with different arrangements of ferromagnetic coating.

In the configuration of FIG. 4, the flexible ferromagnetic coating 24 is arranged in coating lanes 32, with exposed substrate visible between the coating lanes. Across the width of the product (i.e., perpendicular to the lanes of resin and coating), each coating lane 32 overlaps the edges of two adjacent lanes 20 of resin, such that the coating provides a barrier to foam intrusion through the exposed regions 18 between the lanes of resin layer 14. In this way, the coating can be said to extend under both the exposed regions 18 and the resin layer 14. In some cases the amount of overlap is minor, such that the coating is not disposed directly below any of the touch fastener elements. The regions of substrate 12 between the coating lanes 24 can be said to be exposed through passages 34 defined through the flexible ferromagnetic coating 24. In this example, the passages 34 underlie the resin layer 14, such that the resin layer 14 impedes flow through the passages 34, while the coating lanes impede flow through the regions 18 of substrate exposed on the opposite side of the product.

Because the coating lanes are separated from one another, such that the coating is discontinuous across the width of the product, the coating itself does not appreciably detract from the ability of the product to flex to conform to curved mold surfaces. Rather, the stiffening effects of the alternating resin layer lanes and coating lanes combine to provide a generally consistent bending stiffness across the product width, with the resin layer lanes helping to prevent wrinkling and bunching of the substrate between the coating lanes, and vice versa. Furthermore, for examples in which the ferromagnetic coating contains sufficient iron content to transmit electrical signals, the separated coating lanes may serve as parallel conductors for transmitting signals, and perhaps electrical power, along the product. In automotive seating, for example, such conductivity can be employed for occupant sensing or cushion heating. Similarly, fully coated widths can be grounded and employed for radiation shielding and static dissipation functions.

Figure 5:
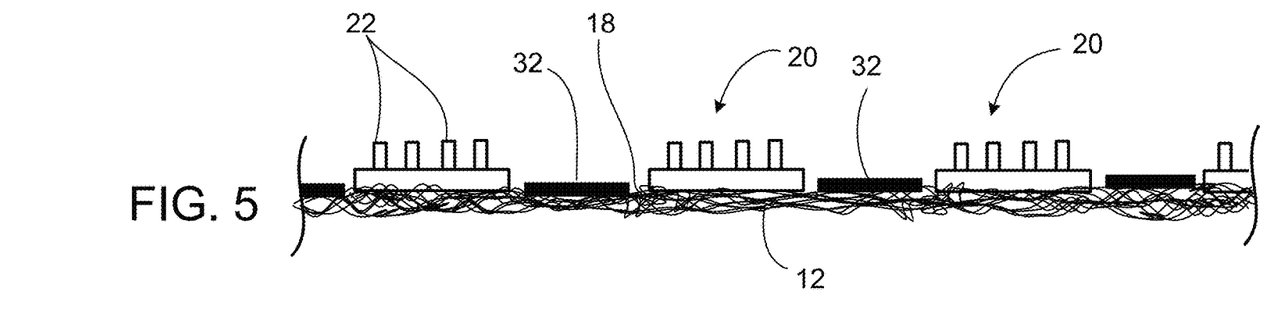

The configuration of FIG. 5 is similar to that of FIG. 4, other than that the coating lanes 32 are disposed on the same side of the substrate 12 as the resin lanes 20, with each coating lane 32 disposed between, and parallel to, two adjacent resin lanes 20. The coating lanes may abut the longitudinal edges of the resin lanes, or may be spaced from the resin lanes by narrow regions of exposed substrate as shown. In this example the opposite or back side of the product is exposed substrate across its entire width. In this configuration the thicknesses of resin and coating are not cumulative, allowing the product to be spooled even tighter, in some circumstances, without added flexing of the substrate. For mold-in applications, any narrow regions 18 of exposed substrate between coating lanes and resin lanes should be sufficiently narrow to impede the flow of foaming resin enough to prevent complete fouling of the touch fastener elements.

Figure 6:
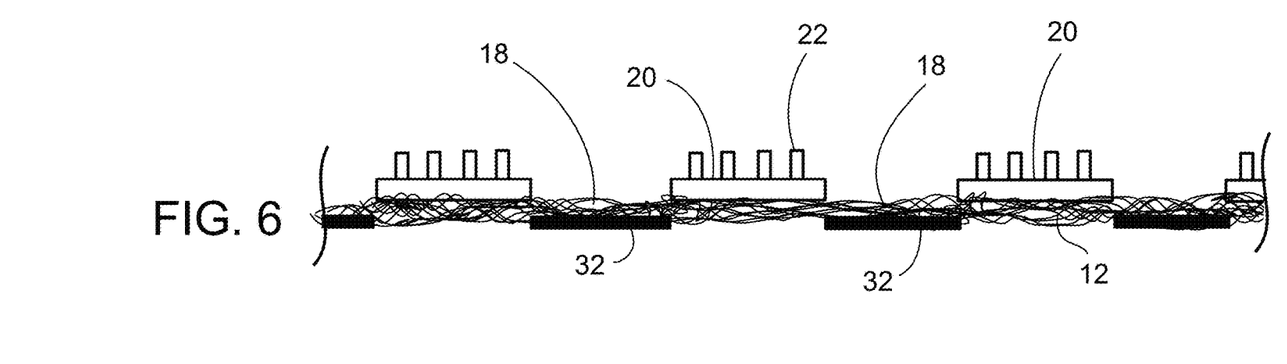

The configuration of FIG. 6 differs from that of FIG. 4 in that the coating lanes 32 do not width-wise overlap the resin lanes 20. However, the coating lanes do underlie at least most of the exposed regions 18 between the resin lanes. In some cases, the longitudinal edges of the coating lanes are aligned vertically with the longitudinal edges of the resin lanes.

Figure 7:
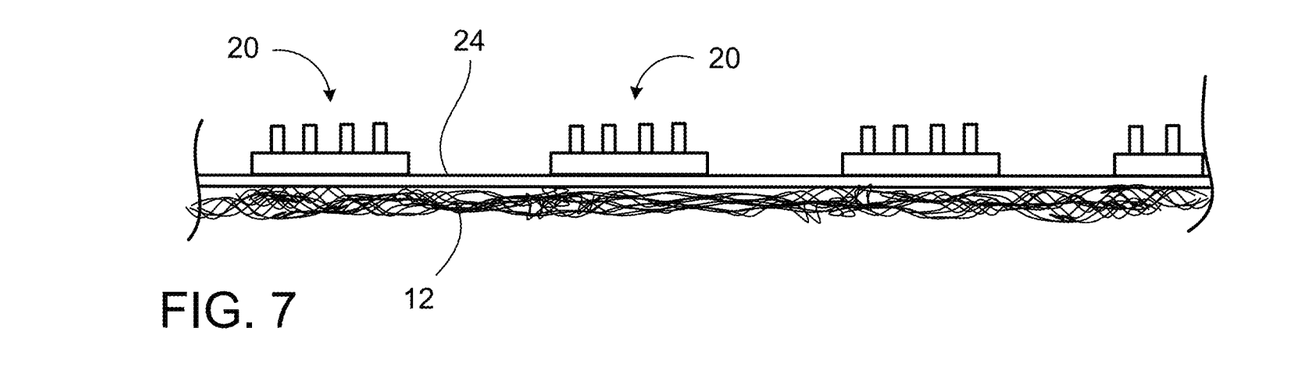

The configuration of FIG. 7 features the flexible ferromagnetic coating 24 on the same side of the substrate 12 as the resin lanes 20, and extending beneath all of the resin lanes to form both a foam intrusion barrier and a magnetically attractable layer on the side of the product that would face a cushion mold surface. For this configuration, the coating itself preferably includes ferromagnetic particles suspended in a resin matrix that is compatible for bonding with resin of the resin layer as the resin layer is molded onto the coating.

Figure 8:
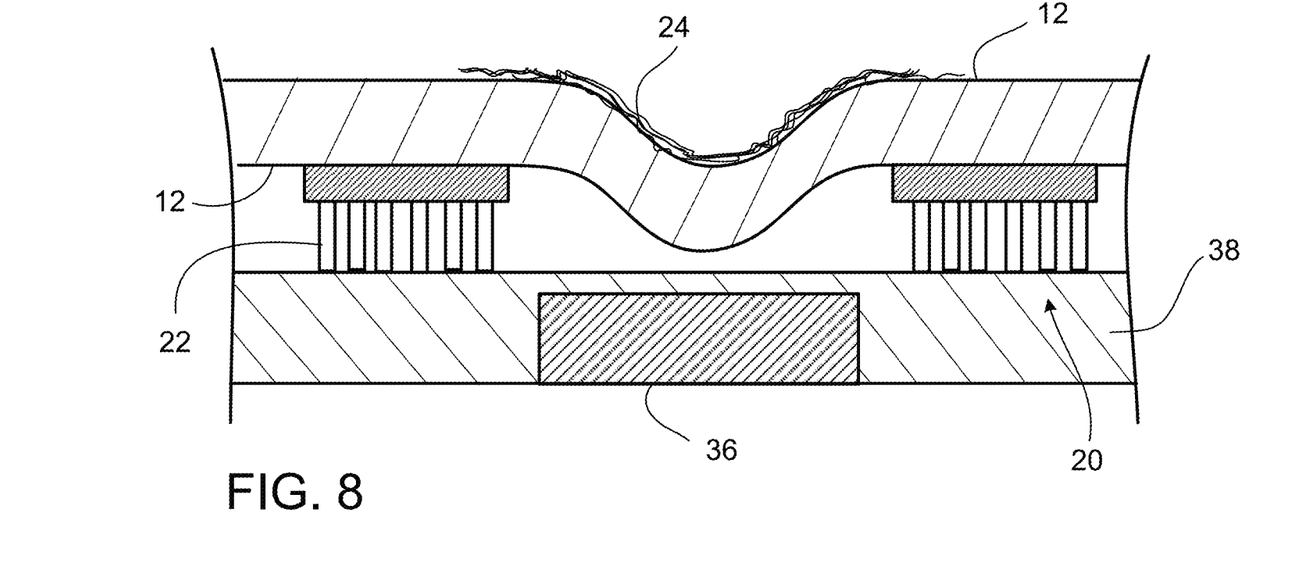
FIG. 8 is an enlarged illustration of a portion of the product of FIG. 4 held against a mold surface.

Referring now to FIG. 8, when a fastener product of the configuration shown in FIG. 4, or any other configuration in which the flexible ferromagnetic coating is present in areas between resin lanes, attraction between the coating and a magnet 36 embedded in the mold wall 38 can cause the thin, flexible substrate 12 to flex toward the mold wall, whereas at the resin lanes the touch fastener elements 22 hold the substrate slightly spaced from the mold surface. In this figure the effect is exaggerated for illustration. Depending on the spacing between resin lanes, the flexibility of the substrate, and the intensity of magnetic attraction, the substrate can lie directly on the surface of the mold between the hook lanes during foaming. This can be particularly desirable along the edges of the product, to help to inhibit foam intrusion around the edge fastener elements. It should be noted that in these examples the product does not feature any added foam barrier, either as a gasket or as molded features of the product, to prevent foam intrusion. Rather, these products are designed to accommodate limited foam intrusion about the edges, leaving sufficient touch fastener elements exposed for engagement with the seat cover. This can be one particular advantage of configuring the product as relatively wide, for example between 5 and 60 centimeters in width and even longer length, such that edge foam intrusion that fouls even all of the outer two resin lanes will leave sufficient hooks exposed in the inner lanes to hold the seat cover in place.

Figure 9:
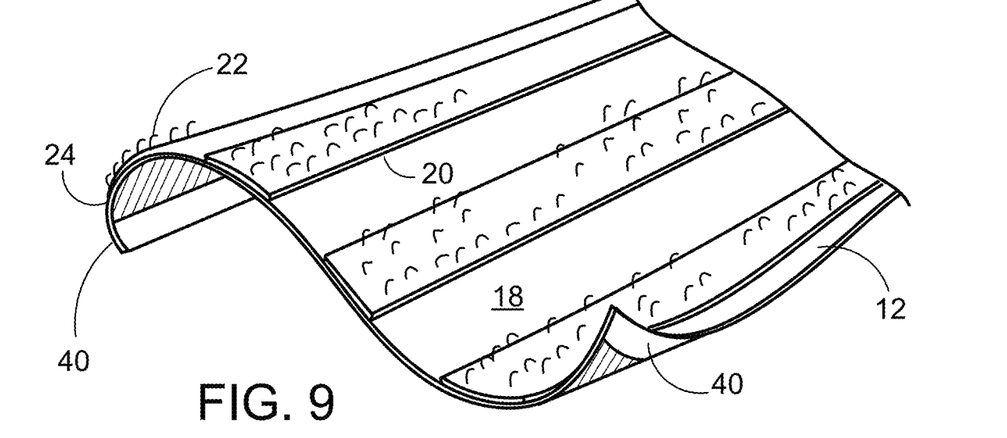
FIG. 9 is a perspective view of a flexible fastener product with coating-free selvedges.

Referring now to FIG. 9, another fastener product differs from the product 10 of FIG. 1 only in that the flexible ferromagnetic coating 24 does not extend across the entire back side of the product. Rather, coating-free selvedges 40 run along the longitudinal edges of the product, in which the substrate 12 is exposed on the back side of the product. The coating-free selvedges can help to enhance anchoring of the product into foam as they are not held tightly against the mold surface during cushion forming. The lack of ferromagnetic coating in the selvedges allows the selvedges to be displaced away from the mold surface by the flowing and expanding foam, so as to become more deeply embedded in the foam.

Figure 10:
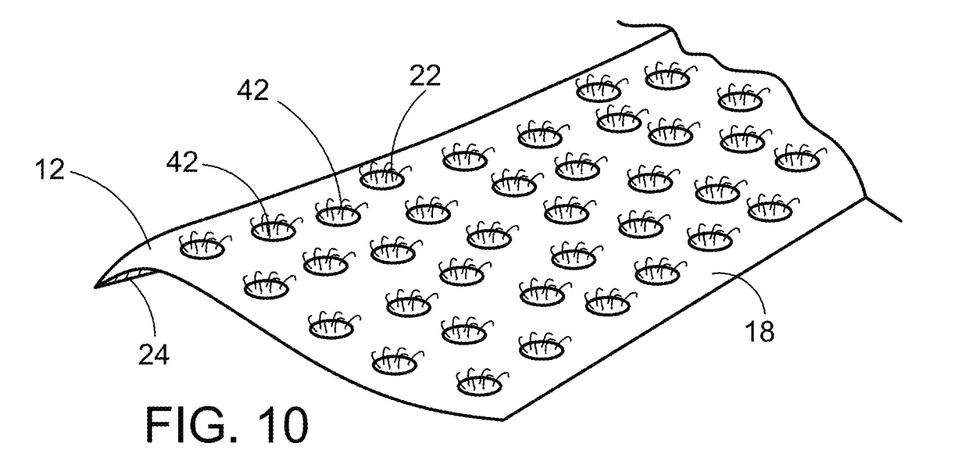
FIG. 10 is a perspective view of a flexible fastener product with a resin layer comprised of spaced-apart islands.

FIG. 10 shows another example of a fastener product sheet, similar to that of FIG. 1 but with the resin layer 14 configured as multiple islands 42 of resin each surrounded by an exposed region of substrate 12. Each island 42 carries a number of touch fastener elements 22 as described above. Because the resin layer is discontinuous in all directions across the product, the resin layer itself does not appreciably add to the stiffness of the product in any direction. The flexible ferromagnetic coating 24, rather, is employed to add the requisite stiffness to the inexpensive non-woven substrate. The islands 42 can be evenly spaced in a regular grid pattern, or can be arranged in a non-uniform pattern according to the desired distribution of fastening properties in the final product for its intended application. Also, the islands may each be of any desired perimeter shape. As with the fastening products described above, the islands themselves are void of any features extending upward from their flat upper surfaces other than the touch fastener elements, and have no specific foam barrier about their perimeters.

Figure 10A:
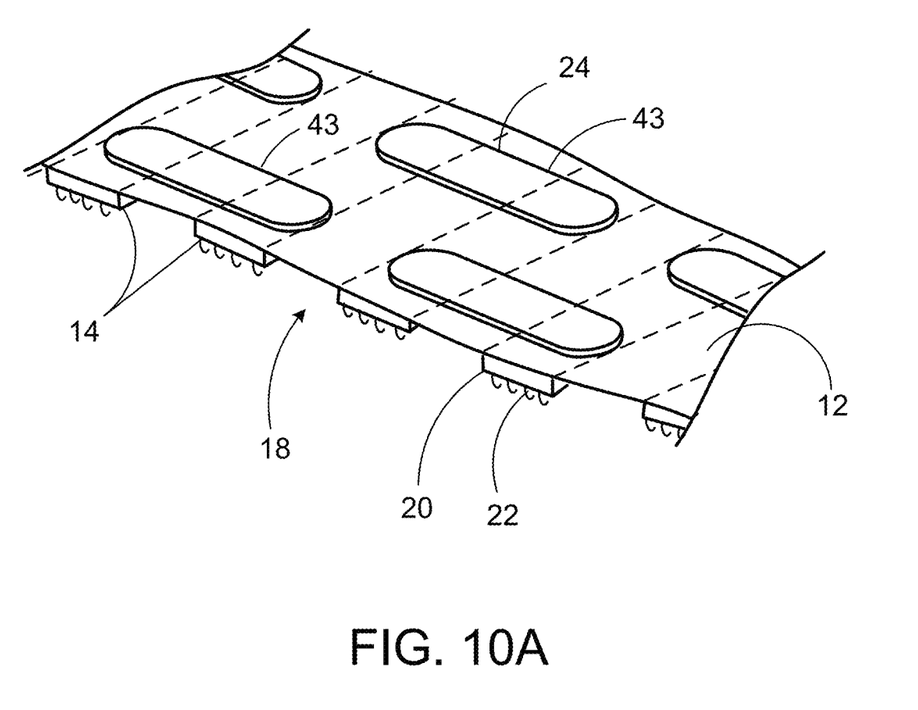
FIG. 10A is a perspective view of a flexible fastener product with a resin layer comprised of spaced-apart lanes and a ferromagnetic coating comprised of spaced-apart islands.

FIG. 10A shows another example of a fastener product sheet, similar to that of FIG. 1 but with the ferromagnetic coating 24 configured as a pattern of spaced-apart coating islands 43 on the non-fastening side of the product sheet. The coating islands are spaced such that substrate 12 is exposed between adjacent islands, and each island is elongated in the cross-machine direction to span two adjacent lanes 14 of the resin layer on the fastening side of the product sheet. Coating islands may be applied by gravure or ink-jet printing, for example. The spanning of the spaces between adjacent resin layer lanes by the coating islands helps to avoid buckling or wrinkling of the substrate between the resin layer lanes, easing proper placement in the mold and allowing the use of even thinner, more flexible substrates. The spacing of the coating islands also helps to lower the amount of coating material employed in the product sheet, lowering material costs. Other arrangements of coating island pattern and shape are also envisioned, beyond the example shown.

Figure 11:
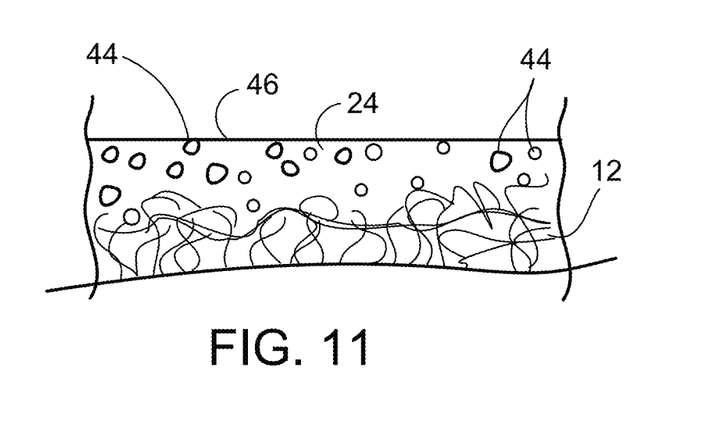
FIG. 11 is an enlarged cross-sectional view through a thick ferromagnetic coating and substrate.

Referring next to FIG. 11, the flexible ferromagnetic coating 24 coats one side of the substrate 12, in many cases forming a backing with a smooth exposed surface 46 free of substrate fibers. In some other examples, the coating coats individual fibers of the surface of the substrate but is not of sufficient thickness to provide a smooth backing. Rather, the coated surface retains a rough topography caused by the distribution of substrate fibers. In either event, the coating preferably encapsulates at least portions of the outermost fibers of the substrate. The coating is applied as a flowable material in which discrete magnetically attractable particles 44 are suspended. After application the material solidifies or stabilizes to form a permanent but flexible coating containing the particles 44. An example of a suitable ferromagnetic material that can be sprayed or screen printed onto the fabric is a 50/50 weight mixture of 45 micron stainless steel powder (product code 430L, available from Advantage Metal Powders of Ridgeway, PA, USA) and water based acrylic paint ES 7174 Grey (from Prisa Paint, Mexico). In arrangements such as FIG. 7 where the resin layer is to be molded directly onto the coating, the coating material may be iron powder suspended in a polymer of the same base resin as the resin layer to promote chemical bonding, and the properties of the coating can be selected to avoid melting through the coating during resin layer molding but to allow some reflow of the coating adjacent the layer. In some cases, particles 44 are of a stainless steel to inhibit rust developing over time. Coating 24 may be applied as a spray or by roll or kiss-coating, or even by ink-jet printing using appropriately-sized print nozzles. Coating 24 may be applied to the substrate as a preliminary step and the coated substrate spooled and stored prior to forming the resin layer and touch fastener elements. Alternatively, in many configurations the coating may be applied after the resin layer has been molded onto the substrate.

Figure 12:
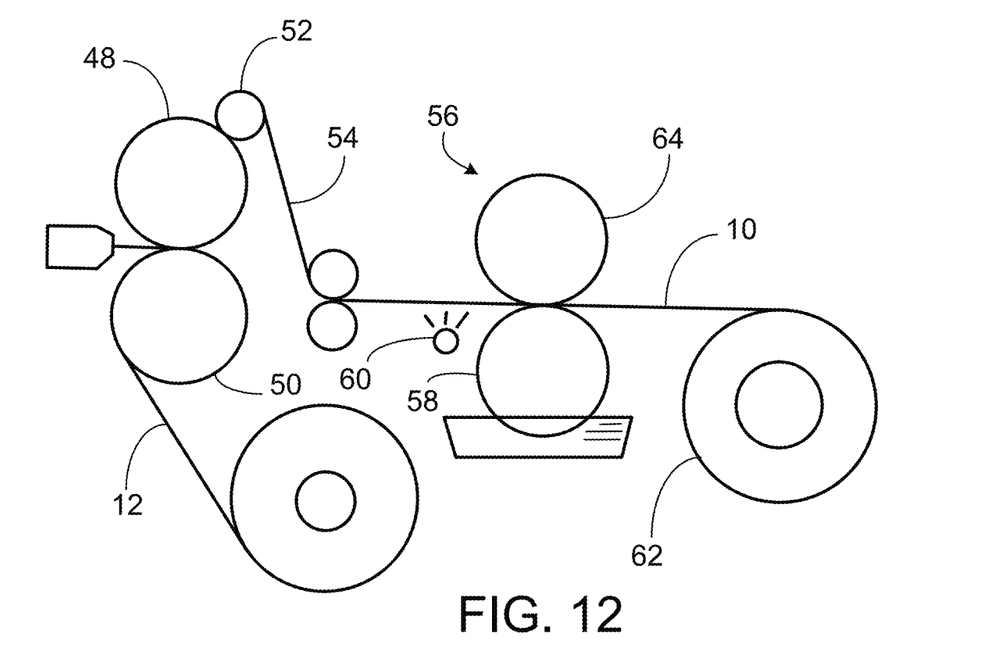
FIG. 12 is a schematic illustration of a method and apparatus for manufacturing a continuous flexible touch fastener product.

Referring to FIG. 12, a method of and apparatus for, continuously forming product 10 of FIG. 1 features first molding the resin layer, with its fastener elements, directly on a textile sheet surface, such as was taught in Kennedy et al, U.S. Pat. No. 6,248,419, in discrete islands or spaced apart lanes as taught in Krantz et al, U.S. Pat. No. 7,048,818, the contents of both of which as to forming methods and lane/island distribution and substrate materials are hereby incorporated by reference. This forming method involves introducing a flowable resin into a nip between rotating mold roll 48 and pressure roll 50 along with preformed non-woven substrate 12. In the molding nip the resin encapsulates surface fibers of the substrate and also fills individual blind cavities in the mold roll to form at least the stems of the fastener elements. The resin may be introduced as continuous lanes of resin, such as from a deckled die as shown, to form resin fastening lanes on the sheet (e.g., lanes 20 of FIG. 1), or may be introduced as discrete deposits of resin, such as by printing such deposits onto the surface of the mold roll or textile sheet immediately upstream of the molding nip between rolls 48 and 50. Once the substrate and resin have been carried on the cooled mold roll a sufficient time to solidify the resin, the substrate is stripped from the roll by passing about stripper roll 52. If only fastener element stems were molded on roll 48, at this point heads may be formed on the stems, such as to form mushroom-type fastener elements, as known in the art. At this point the preform product 54 is a dimensionally stable sheet of fastener material with lanes or islands of resin on one side, each lane or island carrying engageable fastener elements. Such a product may be spooled for later processing, or fed directly into a ferromagnetic coating application station 56, as shown.

In station 56, flowable ferromagnetic coating material is applied to the preform material 54, such as by transferring coating material directly to the back side of the preform material using a transfer roll 58, or spraying the coating onto the substrate using a sprayer 60. If the coating is to be applied only in lanes, the coating may be sprayed through a stencil, or rolled on using narrow transfer rolls, either on the back of the preform product or on the fastening side of the preform product between resin lanes. In such cases, optical sensors or known web alignment techniques may be employed to ensure that the coating lanes are properly positioned with respect to the resin lanes. Following application of the coating material, the coating may be stabilized by drying or curing, such as by passing through an oven under by an ultraviolet light, and then the fastener product 10 may be collected as a spool 62 for storage or shipment.

In many cases, however, the molding process shown in FIG. 12 will begin with a spool of substrate to which the coating has already been applied. This coated substrate will be fed into the nip for formation of the resin layer, either as lanes or islands, and then the resulting product spooled. This approach eliminates the need to apply the coating in-line with the resin molding process. The coating may be pre-applied as lanes, with the substrate aligned upon entry to the molding nip to ensure that any resin lanes are properly positioned with respect to the coating lanes. In this sense, FIG. 12 illustrates a method of making a longitudinally continuous touch fastener product 10, by: unspooling a flexible substrate 12 having a pre-applied ferromagnetic coating; feeding the flexible substrate into a molding nip (i.e., the nip between rolls 48 and 50); and molding a resin layer on one side of the flexible substrate, leaving a region of the one side of the flexible substrate exposed, such that the ferromagnetic coating extends under both the resin layer and the exposed region of the one side of the flexible substrate (such as in the product 10 of FIG. 1).

For products intended to be separated into discrete areas for use, the nip between rolls 58 and 64 may also serve as a die-cutting nip in which the product is at least partially severed about the outer perimeter of an area to be separated from the spooled product for installation.

Figure 13:
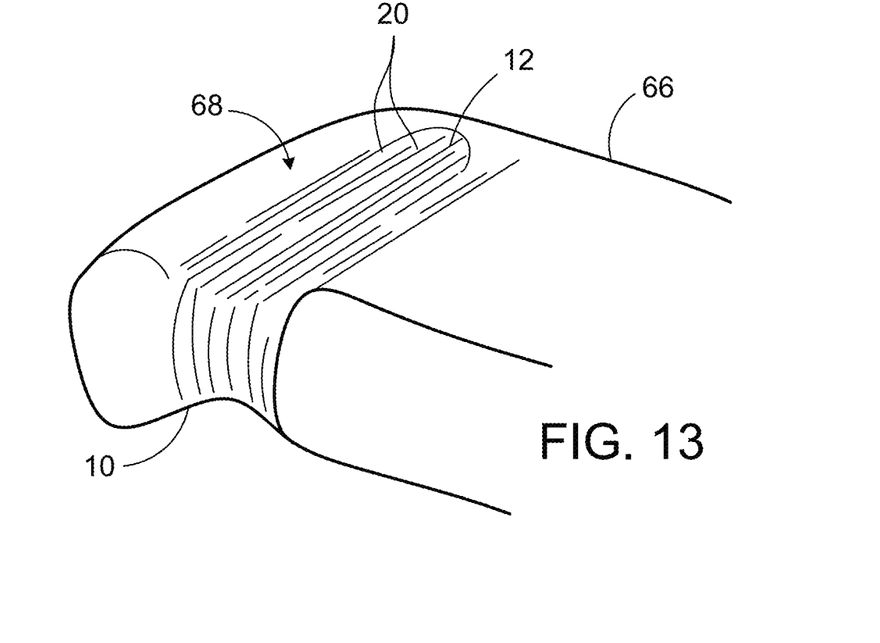
FIG. 13 is a perspective view of a seat cushion including the fastener product of FIG. 1.

Referring next to FIG. 13, one application for the fastener products described herein is in the manufacture of foam seat cushions to be covered by a trim cover. In this example, a cushion 66 is formed of molded foam and is molded to define a broad elongated depression or channel 68. The location and size of this depression is merely representative to illustrate the function of the fastener product; in commercial seat cushions the position and shape of various depressions will be determined by the seat designer to provide the desired appearance, comfort and function of the covered cushion. The fastener product 10 of FIG. 1 is permanently attached to the foam to form the surface of channel 68, with the resin lanes 20 extending along the channel and substrate 12 exposed between the lanes. The fastening product has been molded into the foam by a mold-in process described below. In many cases the edges of the product will be embedded in the foam, further helping to anchor the fastening product in the foam. Notably, fastener product provides multiple lanes of exposed fastener elements for engagement with the seat cover, and these lanes follow the desired contour of the channel, with fastener elements extending generally perpendicularly to the local channel surface. In this way, fastener product 10 forms a generally concave fastening area that follows the compound curvature of the channel, even as the channel extends around an edge of the cushion to form aligned depressions on both the top and front of the cushion. For use in lining wide depressions such as channel 68, the fastener product 10 may be provided on a spool of the desired width, such that an operator need only cut a length of the product from the spool and place it into the mold for forming the cushion. An example of such a product and spool width is 60 millimeters, but in various applications the product width is between 50 and 600 millimeters. Such a 60 mm wide product may be slit before spooling, from a manufacturing width of, for example, 30 centimeters.

Figure 14:
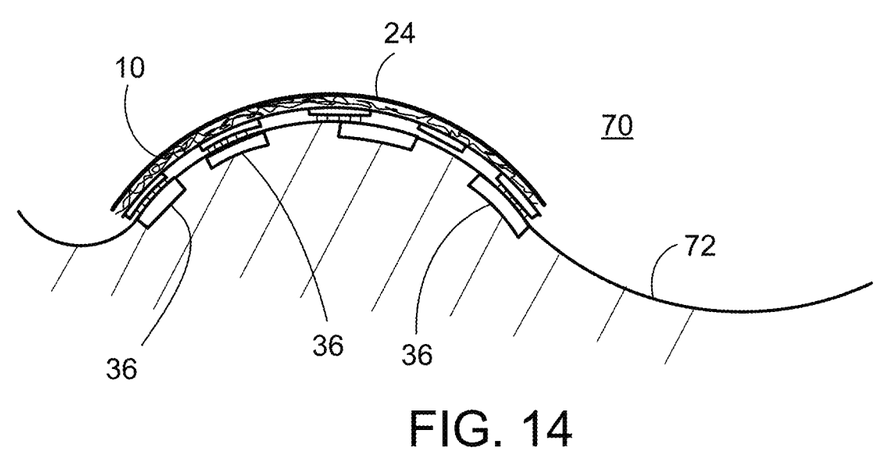
FIG. 14 shows, in cross-sectional view, the touch fastener product of FIG. 1 installed in a seat cushion mold.
Figure 15:
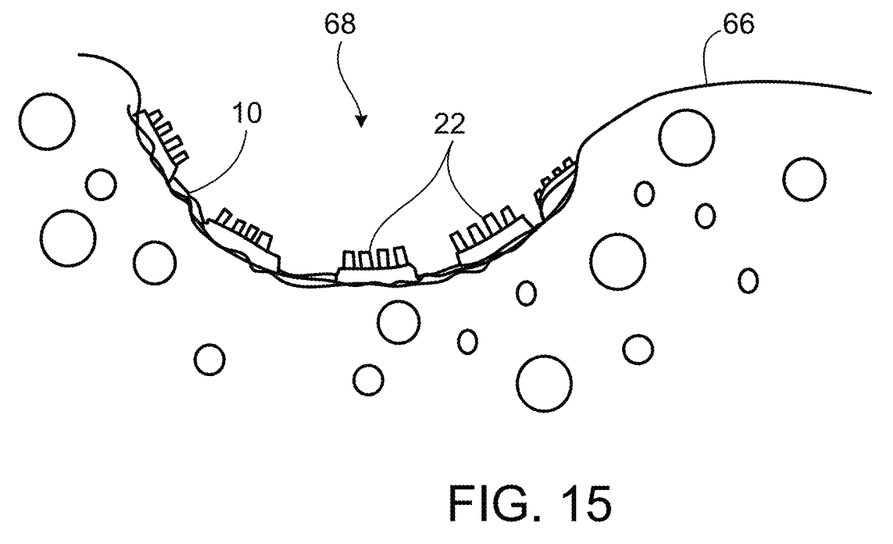
FIG. 15 is a cross-sectional view of a portion of a seat cushion formed with the fastener product of FIG. 1 lining a depression or channel.

Referring next to FIG. 14, a foam seat cushion may be formed in a mold cavity 70 defined between two mold halves 72, only one of which is illustrated. Before introducing liquid foaming resin into the cavity, a mold-in product such as product 10 is placed against the surface of mold half 72 and held in place by attraction between a series of permanent magnets 36 embedded in the mold surface and the ferromagnetic coating 24 of the mold-in product. Magnets 36 may be positioned to align with the coating lanes if the coating is arranged in lanes, or otherwise to hold the entire perimeter of mold-in product 10 against the mold surface to inhibit foaming resin from intruding into the fastening area of the mold-in product and fouling the fastening elements. The magnets 36 not only hold the product against the mold surface but can also help to accurately position the product on the surface. With the mold-in product positioned, the mold cavity is closed and the expanding foaming resin bonds to the exposed back surface of the mold-in product. When the solidified foam seat cushion is pulled from the mold, mold-in product 10 is embedded in its surface and the fastener elements are exposed for engagement with the underside of a seat cover, as shown in FIG. 15.

In the above examples of fastener product, the substrate 12 is a polypropylene SMS-type non-woven material, with a basis weight of 106 grams per square meter, available from Sommers Nonwoven Solutions of Mooresville, NC, USA. Other examples of non-woven textile substrates include other SMS non-wovens such as of polypropylene in the weight range of 30 to 200 gsm (preferably 100 to 150 gsm), and spunbond non-wovens, such as Foamguard LX 47754, and LX Grey FR 15025, both available from Hanes Companies (https://hanescompanies.com/), a Leggett & Platt company. However, other types of substrates may be employed, such as a lightweight knit or even a suitable film.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of making a longitudinally continuous touch fastener product, the method comprising:
unspooling a flexible substrate having a ferromagnetic coating;
feeding the flexible substrate into a molding nip; and
molding a resin layer on a first side of the flexible substrate, leaving a region of the first side of the flexible substrate exposed, such that the ferromagnetic coating extends under both the resin layer and the exposed region of the first side of the flexible substrate, and then,
after molding the resin layer, spooling the touch fastener product to form a roll.

2. The method of claim 1, wherein the ferromagnetic coating covers only a portion of a second side of the flexible substrate, as the flexible substrate is fed into the molding nip.

3. The method of claim 2, wherein the ferromagnetic coating is arranged in spaced apart coating lanes.

4. The method of claim 3, wherein the coating lanes are electrically conductive along a length of the fastener product.

5. The method of claim 2, wherein the ferromagnetic coating is arranged in spaced apart coating islands, each coating island surrounded by exposed substrate.

6. The method of claim 2, wherein the second side of the flexible substrate has longitudinal selvedges free of ferromagnetic coating.

7. The method of claim 2, wherein the ferromagnetic coating defines passages in which the flexible substrate is exposed.

8. The method of claim 7, wherein the passages underlie the resin layer, such that the resin layer impedes flow through the passages.

9. The method of claim 1, wherein the resin layer is molded such that the touch fastener elements are the only features extending from the layer away from the flexible substrate.

10. The method of claim 1, wherein the resin layer is molded in multiple parallel lanes of resin and wherein the exposed region comprises multiple areas of exposed substrate between the lanes of resin.

11. The method of claim 10, wherein the flexible ferromagnetic coating extends under all of the parallel lanes of resin.

12. The method of claim 1, wherein the resin layer is molded in multiple islands of resin each surrounded by the exposed region.

13. The method of claim 1, wherein feeding the flexible substrate into the molding nip comprises feeding a non-woven textile material into the molding nip.

14. The method of claim 1, wherein the flexible ferromagnetic coating is impermeable to air.

15. The method of claim 1, wherein the flexible ferromagnetic coating comprises particles containing iron suspended in a polymeric material.

16. A method of making a longitudinally continuous touch fastener product, the method comprising:
unspooling a flexible substrate having a ferromagnetic coating;
feeding the flexible substrate into a molding nip; and
molding a resin layer on a first side of the flexible substrate, leaving a region of the first side of the flexible substrate exposed, such that the ferromagnetic coating extends under both the resin layer and the exposed region of the first side of the flexible substrate,
wherein the resin layer is molded in multiple parallel lanes of resin and wherein the exposed region comprises multiple areas of exposed substrate between the lanes of resin.

17. The method of claim 16, wherein the ferromagnetic coating covers only a portion of a second side of the flexible substrate, as the flexible substrate is fed into the molding nip.

18. The method of claim 17, wherein the ferromagnetic coating is arranged in spaced apart coating lanes.

19. The method of claim 18, wherein the coating lanes are electrically conductive along a length of the fastener product.

20. The method of claim 17, wherein the ferromagnetic coating is arranged in spaced apart coating islands, each coating island surrounded by exposed substrate.

21. The method of claim 17, wherein the second side of the flexible substrate has longitudinal selvedges free of ferromagnetic coating.

22. The method of claim 17, wherein the ferromagnetic coating defines passages in which the flexible substrate is exposed.

23. The method of claim 22, wherein the passages underlie the resin layer, such that the resin layer impedes flow through the passages.

24. The method of claim 16, wherein the resin layer is molded such that the touch fastener elements are the only features extending from the layer away from the flexible substrate.

25. The method of claim 16, wherein the flexible ferromagnetic coating extends under all of the parallel lanes of resin.

26. The method of claim 16, wherein feeding the flexible substrate into the molding nip comprises feeding a nonwoven textile material into the molding nip.

27. The method of claim 16, wherein the flexible ferromagnetic coating is impermeable to air.

28. The method of claim 16, wherein the flexible ferromagnetic coating comprises particles containing iron suspended in a polymeric material.

29. The method of claim 16, further comprising, after molding the resin layer, spooling the touch fastener product to form a roll.

30. A method of making a longitudinally continuous touch fastener product, the method comprising:
unspooling a flexible substrate having a ferromagnetic coating;
feeding the flexible substrate into a molding nip; and
molding a resin layer on a first side of the flexible substrate, leaving a region of the first side of the flexible substrate exposed, such that the ferromagnetic coating extends under both the resin layer and the exposed region of the first side of the flexible substrate,
wherein the flexible ferromagnetic coating is impermeable to air.

* * * * *